United States Patent [19]

Haigh et al.

[11] 4,391,931

[45] Jul. 5, 1983

[54] CAPSULES CONTAINING SELF-SETTING COMPOSITIONS AND THE COMPOSITIONS

[76] Inventors: Jeffrey G. Haigh, 31 Milton Dr., Newport Pagnell, Buckinghamshire; Leslie W. Cheriton, 3 Meadow Way Wing, Leighton Buzzard, Bedfordshire, both of England

[21] Appl. No.: 291,852

[22] Filed: Aug. 10, 1981

[51] Int. Cl.³ .............................................. C08J 3/00
[52] U.S. Cl. .................................... 523/318; 206/219; 206/220; 206/221; 206/222; 206/568; 523/457; 524/423; 524/437; 524/700; 524/781; 524/787; 524/786; 525/27

[58] Field of Search ................. 525/27; 206/568, 219, 206/220, 221, 222; 260/45.7 ST, 29.2 TN, 29.2 EP, 29.2 E, 28 R; 523/318, 457; 524/423, 786, 437, 781, 787, 700

[56] References Cited

U.S. PATENT DOCUMENTS

| | | | |
|---|---|---|---|
| 3,953,565 | 4/1976 | Mizutani et al. | 260/45.7 R |
| 3,996,722 | 12/1976 | Bernhardt | 206/219 |
| 4,007,831 | 2/1977 | Bernhardt | 206/219 |
| 4,019,630 | 4/1977 | Plaisted | 206/219 |
| 4,260,699 | 4/1981 | Plaisted | 525/27 |

*Primary Examiner*—Melvyn I. Marquis
*Attorney, Agent, or Firm*—Caesar, Rivise, Bernstein & Cohen, Ltd.

[57] ABSTRACT

Water and a hydrated salt are both present to reduce the flammability of a flammable resin system, e.g. a capsule having two compartments each containing an interactive component and for use in e.g. a mine.

13 Claims, No Drawings

CAPSULES CONTAINING SELF-SETTING COMPOSITIONS AND THE COMPOSITIONS

The invention relates to capsules containing self-setting compositions of low flammability and to the compositions themselves. Typically the compositions contain two interactive components such as an unhardened resin and a hardener therefor. The resin may be polyester, epoxy or polyurethane resin. The resin component generally contains the resin, a resin cross-linking substance, for example styrene in the case of polyester, and inert fillers. The hardener usually contains a polymerisation catalyst, for example, a peroxide of an organic acid, to promote the cross-linking reaction and it may also contain fillers and modifiers.

The two interactive components of the compositions can be supplied in bulk but it is more usual to provide capsules having two compartments, each containing a separate component. In one use, the capsule is placed in a borehole in a substrate and a reinforcing element such as an anchor bolt is driven into the hole with rotation to rupture the capsule and intermix the components to form the self-setting composition which sets to anchor the bolt. Such a system is now widely used in building, construction, civil engineering and mining industries for anchoring, strata control, and like processes.

For certain applications there is a risk attendant to the use of the resinous compositions. In mining for example the resins can be hazardous because of their flammability or that of some of their ingredients, e.g. styrene. This problem has been recognised and it is known to replace the styrene commonly used with an organic substance having a higher flash point, such as vinyl toluene. Such materials have drawbacks, e.g. they do not self-extinguish and are expensive. There is thus a need for an improved self-setting composition of low flammability especially for use in a capsule.

It is one object of this invention to provide a capsule incorporating a self-setting composition formulated to have low flammability without loss of anchorage strength.

According to one feature of the invention there is provided a capsule containing in separate compartments the interactive components of a self-setting composition, e.g. an unhardened resin and a hardener therefor, at least one of the components comprising a flammable substance characterised in that sufficient water is present to suppress flame when the capsule is exposed to heat and that some of the water is in the form of a hydrated salt.

It is a characteristic of the invention that water be present both as free water and as chemically bound water in the form of a hydrated salt. If free water alone is present, e.g. in the form of a wetted filter, then while flame may be suppressed, the composition will not have sufficient strength and the water may tend to separate out on storage; if the hydrated salt only is present, then it is not possible to suppress flame under all conditions. For this reason in accordance with the invention both forms are present and a compromise is struck between flame suppression and strength.

It is also important to have regard to the viscosity of the interactive components; if the viscosity is too low the mix will flow from an upward hole whereas if it is too high the mix will be too stiff for an anchor element to be forced therein by manual labour. In practice the viscosity of the component should be about 5000–7,500 poise at 20° C. when measured on a Brookfield RVF Helipath Viscometer and the viscosity of both components should be substantially the same otherwise adequate mixing may not take place.

Examples of suitable hydrated salts are aluminium sulphate ($Al_2(SO_4)_3.18H_2O$), ammonium aluminium sulphate ($NH_4Al(SO_4)_2.12H_2O$), sodium aluminium sulphate ($NaAl(SO_4)_2.12H_2O$), potassium aluminium sulphate ($KAl(SO_4)_2.12H_2O$), sodium sulphate ($Na_2SO_4.10H_2O$), gypsum ($CaSO_4.2H_2O$) and copper sulphate ($CuSO_4.5H_2O$). It is desirable that the hydrated salt releases at least some of its water at a relatively low temperature, and preferably of the order of 150° C. or less.

Hydrated aluminium sulphate is particularly suitable because it begins to lose its chemically bound water at a temperature as low as 40° C. Of the other salts listed above hydrated ammonium aluminium sulphate releases ten of its twelve molecules of water at 120° C., sodium sulphate releases all ten molecules at 100° C., copper sulphate releases four of its five molecules at 110° C., and gypsum releases 1½ molecules of water at 128° C.

It is preferred to optimise the ratio of water present as hydrated salt to water present as free water to give the optimum composition viscosity and set strength characteristics.

The self-setting composition will have a desired level of strengh after setting i.e. the strength will not be reduced unduly compared with a capsule having the equivalent flammable ingredients. In general the compressive strength should exceed 20 Newtons/sq. mm. For this reason the hydrated salt is preferably one which when present in the quantity needed to suppress the burning of the flammable component does not substantially affect the set strength of the composition. The hydrated salt preferably makes up from about 10 to about 50% of the total composition, and may make up part of the filler portion; the other filler portion may be made up of one or more of ground firebrick, or limestone, sand, silica flour, slate powder, fly ash, a clay, or the like.

In the case of hydrated aluminium sulphate and a composition containing 75% of slate powder as filler, it is desirable to replace approximately 50% of the slate powder with the hydrated aluminium sulphate. It is possible to include free water in the composition preferably absorbed on one of the fillers indicated above, provided that the concentration thereof is not so high that the strength of the set composition is weakened to an unacceptable level.

The flammable component in the self-setting composition may be, for example, an unhardened resin such as a polyester, an epoxy resin or a polyurethane. In the case of polyester resin the composition may consist of, as one interactive component, an unsaturated polyester resin (especially a thixotropic resin), a styrene as a cross-linking agent, an accelerator such as dimethylaniline or cobalt naphthenate, and fillers. As the other interactive component the hardener may include benzoyl peroxide or methyl ethyl ketone peroxide, plasticisers and fillers. The hydrate salt and water may be present in both or only one of the interactive components.

The cartridge may be of the type described and claimed in our U.S. Pat. No. 4,019,630 and U.S. Pat. Nos. 3,996,722 and 4,007,831, both the disclosures of which are incorporated by this reference.

According to a much preferred feature of this invention, there is provided in the self-setting composition a film forming material to form a flame suppressing film on the surface of burning matter. The film forming ingredient is preferably a wax, most conveniently a paraffin wax; another film forming ingredient is stearin. When a capsule wall is ruptured and the flammable styrene escapes, the film forming ingredient will form a film to seal the wall; if the capsule wall is burned away, the film forming ingredient will seal the exposed material. The film forming ingredient is usually present with the resin component, but may be present in the catalyst component. The proportion of the film forming ingredient will be related to the concentration of the flammable ingredient; in the case of styrene containing compositions from 5000 to 10,000 ppm of the resin is useful.

Where a wax is present, a preferred resin base comprises:

(a) a filler comprising a hydrated salt and other fillers, such as ground limestone and sands, in a ratio of 1:10–10:1, preferably 1:1, these fillers being wetted with water, typically in a weight ratio of filler to water of about 0.1 to about 3:1, preferably 0.1:1

(b) an unsaturated polyester resin, most preferably a thixotropic polyester resin, in a ratio of about ¼ to 1:1 of the damp filler, preferably 1:4

(c) a paraffin wax at about 5,000 ppm of resin, and (d) an accelerator such as dimethylaniline or cobalt naphthenate may be included.

A preferred hardener therefor comprises:

(i) a peroxide catalyst such as benzoyl peroxide, methyl ethyl ketone peroxide or cyclohexanone peroxide, in a weight percentage of from about 4 to 60 preferably about 25 of the catalyst component (ii) a filler or blend of fillers such as ground limestone, gypsum, china clay, in a weight percentage of about 6 to 60 preferably about 50

(iii) water in a weight percentage of about 2 to 30 preferably about 20 and (iv) a plasticiser such as dibutyl phthalate, in a weight percentage of 0 to 50 parts, preferably 1 part.

The resin component is mixed with the hardener component in a weight ratio of about 2 to 50:1, preferably about 8 to 15:1.

The capsules of the invention have extremely low flammability and have been found to satisfy the stringent flammability tests of the United Kingdom National Coal Board for products to be used in mines. Although the compositions will support a flame when exposed to an external flame, the flame extinguishes in a matter of seconds when the external flame is removed.

The invention includes as a separate composition, a self-setting composition as defined, to be included in a capsule or to be as a self-setting composition in bulk form and a dry component characterised by the presence in at least one interactive component of a hydrated salt.

The invention is illustrated by the following Examples in which all parts are by weight unless otherwise specified.

EXAMPLE 1

A series of evaluations was performed to determine the effect of defined additives on the flammability of the interactive components of a self-setting polyester system. One interactive component was resin including flammable styrene and the other was a catalyst component including flammable benzoyl peroxide. In each case a mix was made up, the concentration of resin, fillers and additive being adjusted to give the mix a viscosity of about 5000 poise at 20° C., measured on a Brookfield RVF Helipath Viscometer. The amounts used are shown in the Table. Each mix was separately subjected to a flammability test by playing a flame from a burner on an exposed surface of a sample of the mix and measuring the period in seconds for the flame to continue after the burner was removed. In another test the resin and catalyst components were mixed in a weight ratio of 10:1 and allowed to set; the compressive strength was determined in Newtons/sq. mm. The results are shown in the Table. The results show that free water and a hydrated salt both reduce the flammability of both components but this leads to a reduction of compressive strength relative to a control composition. When both the free water and the salt are present flammability is reduced to an acceptable level and the compressive strength is sufficient. For most purposes the flame should not continue for more than about 5 seconds and a compressive strength exceeding 20 Newtons/sq. mm. is required if an adequate anchor bolt pull-out strength is to be achieved.

TABLE

| Capsule | RESIN COMPONENT | | | | CATALYST COMPONENT | | | | SET COMPOSITION Strength (N/sq. mm) |
| --- | --- | --- | --- | --- | --- | --- | --- | --- | --- |
| | Resin Filler | Water | Gypsum | Flame (secs) | Catalyst/ filler | Water | Gypsum | Flame | |
| 1 | 100 | 0 | 0 | 50 | 100 | 0 | 0 | 50 | 45 |
| 2 | 90 | 1 | 0 | 10 | 100 | 0 | 0 | 50 | 16 |
| 3 | 100 | 0 | 0 | 45 | 75 | 25 | 0 | 0 | 43 |
| 4 | 90 | 10 | 0 | 10 | 75 | 25 | 0 | 0 | 23 |
| 5 | 55 | 0 | 45 | 15 | 100 | 0 | 0 | 50 | 26 |
| 6 | 100 | 0 | 0 | 50 | 50 | 0 | 50 | 4 | 40 |
| 7 | 55 | 0 | 45 | 10 | 50 | 0 | 50 | 4 | 33 |
| 8 | 45 | 10 | 45 | 0 | 25 | 25 | 50 | 0 | 20 |
| 9 | 90 | 10 | 0 | 10 | 75 | 25 | 0 | 0 | 30 |
| 10 | 40 | 10 | 50 | 5 | 75 | 25 | 0 | 0 | 25 |

EXAMPLE 2

A capsule was made as follows.

| | |
| --- | --- |
| resin component: | |
| accelerated polyester resin | 100 |
| hydrated aluminium sulphate ($Al_2(SO_4)_3 \cdot 18H_2O$) | 200 |
| slate powder | 10 |
| Catalyst component: | |
| benzoyl peroxide | 20 |
| gypsum | 100 |
| dibutyl phthalate | 75 |
| hydrated aluminium sulphate ($Al_2(SO_4)_3 \cdot 18H_2O$) | 200 |

The resin and catalyst parts were separately fed in a ratio of 10:1 into a 40 mm diameter by 370 mm long two compartment cartridge. The capsule satisfied the stringent flammability test of the United Kingdom National Coal Board by self-extinguishing in 15 seconds.

EXAMPLE 3

A filler composition was made by blending:

| limestone and like fillers | 92 |
|---|---|
| whiting | 20 |
| silica flour | 20 |
| fine sand | 35 |
| water | 18 |

A resin component was made by blending:

| a pre-accelerated, thixotropio unsaturated polyester resin | 59 |
|---|---|
| paraffin wax | 5000 ppm of resin |

A catalyst component was made by blending:

| benzoyl peroxide | 262 |
|---|---|
| water | 234 |
| whiting | 400 |
| clay | 100 |

The resin component was mixed with the filler component in a weight ratio of 1:3 and inhibitor e.g. catechol dissolved in styrene was added. The resin/filler and the catalyst were then separately supplied to a capsule filling machine to form capsules according to U.S. Pat. No. 4,019,630.

In evaluations the capsule was mounted in a frame and from below a flame was played on the capsule. The flame burned the capsule wall and the organic material therein caught fire. The water evaported and suppressed flame. Lumps of burning matter fell down and as they fell down the wax film enveloped them and suppressed the flame within 5 seconds.

We claim:

1. A capsule containing in separate compartments the interactive components of a self-setting composition, one component comprising an unhardened resin and the other component comprising a hardener therefor, the capsule being rupturable to release the interactive components to intermix them and form the self-setting composition, at least one of the components beig flammable, both free water and hydrated salt being present, the free water or the hydrated salt or both being located in at least one of the components prior to the interaction thereof, the concentration of the free water and the hydrated salt being sufficient to supress the flame of the flammable component but still permitting the set composition to have a strength which exceeds 20 Newtons/mm$^2$.

2. A capsule according to claim 1, characterised in that the hydrated salt is one which releases water at a temperature below 150° C.

3. A capsule according to claim 2, characterised in that the hydrated salt is one which releases water at a temperature below 40° C.

4. A capsule according to claim 1, characterised in that the hydrated salt is selected from aluminium sulphate, sodium aluminium sulphate, potassium aluminium sulphate, sodium sulphate, gypsum and copper sulphate.

5. A capsule according to claim 1, characterised in that the hydrated salt is present in one or each of the interactive components in a concentration of from 10% to 50% by weight of the component.

6. A capsule according to claim 1, characterised in that free water is present in one or each of the interactive components in a concentration of below the level at which it will substantially weaken the strength of the set composition or substantially affect the viscosity thereof.

7. A capsule according to claim 6, characterised in that one or each interactive component includes a filler selected from ground firebrick or limestone, sand or the like and the free water is absorbed into the filler.

8. A capsule according to claim 6 or 7, characterised in that the viscosity of the component is about 5000 poise at 20° C. when measured on a Brookfield RVF Helipath Viscometer.

9. A capsule according to claim 1, characterised in that the concentration of water is sufficient to extinguish flame within 5 seconds.

10. A capsule according to claim 1, characterised by the presence of a film forming ingredient to seal drops of burning flammable material.

11. A capsule according to claim 10, characterised in that the film forming ingredient is a wax.

12. A self-setting composition comprising first and second components, the first component comprising an unhardened resin and the second component comprising a hardener therefor, the two components being intermixed to form said self-setting composition, at least one of the components being flammable, both free water and hydrated salt being present, the free water or the hydrated salt or both being associated with at least one of the components prior to intermixing, the concentration of the free water and the hydrated salt being sufficient to suppress the flame of the flammable component but still permitting the set composition to have a strength which exceeds 20 Newtons/mm$^2$.

13. A composition according to claim 12, characterised in that the hydrated salt is present in one dry interactive component.

* * * * *